United States Patent [19]

Inui et al.

[11] Patent Number: 4,481,518
[45] Date of Patent: Nov. 6, 1984

[54] TRANSFER TYPE HEAT-SENSITIVE RECORDING DEVICE

[75] Inventors: Toshiharu Inui; Fujio Moriguchi; Takashi Ohmori, all of Kanagawa, Japan

[73] Assignee: Fuji Xerox Co., Ltd., Tokyo, Japan

[21] Appl. No.: 423,779

[22] Filed: Sep. 27, 1982

[30] Foreign Application Priority Data

Sep. 25, 1981 [JP] Japan .................. 56-150530

[51] Int. Cl.³ .................. G01D 15/10; B41J 13/02
[52] U.S. Cl. .................. 346/76 PH; 400/120
[58] Field of Search .................. 346/76 PH; 400/120

[56] References Cited

U.S. PATENT DOCUMENTS

| | | | |
|---|---|---|---|
| 1,934,753 | 11/1933 | Wildhaber | 346/76 R |
| 3,476,877 | 11/1969 | Perkins | 346/76 PH |
| 4,163,075 | 7/1979 | Nakano | 346/135 |

FOREIGN PATENT DOCUMENTS 55-100172  7/1980  Japan .................. 346/76 PH

Primary Examiner—E. A. Goldberg
Assistant Examiner—M. Reinhart
Attorney, Agent, or Firm—Sughrue, Mion, Zinn, Macpeak & Seas

[57] ABSTRACT

A heat-sensitive transfer type recording device is provided with a thermal head having heat generating elements and a backing roll operatively positioned relative to the heat generating elements to accommodate the passage of an ink donor sheet and a recording sheet therebetween under pressure. A separation roll is spaced from the backing roll to provide for the passage of said ink donor sheet and said recording sheet therebetween at a pressure substantially less than the pressure exerted on the sheets upon passage between the backing roll and the heat generating elements. The ink donor sheet is directed about the separation roll at a relatively sharp angle to separate the recording sheet from the ink donor sheet with a complete transfer of the ink from the ink donor sheet to the recording sheet as a result of the reduced pressure on the sheets at the separation roll.

4 Claims, 5 Drawing Figures

TRANSFER TYPE HEAT-SENSITIVE RECORDING DEVICE

BACKGROUND OF THE INVENTION

The present invention is directed to a transfer type heat-sensitive recording device in which an ink donor sheet is used to record data by means of thermal transfer on a recording sheet which is supplied to the recording section independently of the supply of an ink donor sheet.

In thermal or heat-sensitive transfer type recording devices the recording operation of data is generally carried out in the same manner. A recording sheet such as a plain sheet of paper is placed on an ink donor sheet coated with solid ink which is sublimated or liquified by heat in a specific pattern. A heat pulse is applied to the ink donor sheet which is in intimate contact with the recording sheet so that the sublimated or liquified ink is transferred onto the recording sheet.

An example of a conventional heat-sensitive transfer type recording device is shown in FIG. 1 wherein a conveying system is adapted to supply an ink donor sheet and a recording sheet to the recording section independently of each other. An ink donor sheet 1 is supplied from a supply roll (not shown), passed through a recording section A comprised of a thermal head 2 and a backing roll 3, and is moved in the direction of the arrow through a separating section B comprised of the backing roll 3 and a drive roll 4. Finally, the ink donor sheet 1 is taken up on a winding roll (not shown). A separate individual recording sheet 5 is delivered to the recording section A and is moved over the heat generating elements 2A of the thermal head while being held in intimate contact with the ink donor sheet 1 by the cylindrical wall of the backing roll 3. In this operation, the heat generating elements 2A generate heat in a selective pattern to transfer the ink onto the recording sheet 5. Thereafter, the recording sheet 5 passes between the backing roll 3 and a drive roll 4 while still in contact with the ink donor sheet. At this point, the direction of movement of the ink donor sheet 1 is changed abruptly along the cylindrical wall of the drive roll 4. However, since the recording sheet 5 cannot follow this abrupt change in direction of the ink donor sheet, the recording sheet will be separated from the ink donor sheet. The separated recording sheet is advanced in the common tangential direction (as indicated by the arrow) relative to the backing roll 3 and the drive roll 4 and is discharged into a receiving tray (not shown).

In the conventional heat-sensitive transfer type recording device described above, the contact pressure of the drive roll 4 as applied to the backing roll 3 is set at a considerably high value, for instance 8 Kg/cm$^2$. This high value is necessary for the drive roll 4 to overcome the frictional resistance in the recording section A to thereby move the ink donor sheet 1 in a stable manner in the scanning direction. However, when the engagement pressure of the drive roll 4 is set at a very high value, the contact pressure between the ink donor sheet 1 and the recording sheet 5 is increased temporarily. As a result, during the separation of the recording sheet 5 from the ink donor sheet 1, a certain amount of ink remains on the ink donor sheet which should have been transferred. If this phenomenon occurs, the recording density is decreased on the corresponding portion of the recording sheet. Therefore, the recorded image is considerably reduced in quality.

SUMMARY OF THE INVENTION

The heat-sensitive transfer type recording device according to the present invention obviates the aforementioned difficulties by providing for a complete and satisfactory transfer of the ink from the ink donor sheet onto the recording sheet. This is accomplished by reducing the contact pressure between the ink donor sheet and the recording sheet downstream from the recording section at the point of separation of the two sheets from each other.

The heat-sensitive transfer type recording device according to the present invention is comprised of a thermal head having heat generating elements, a backing roll operatively associated with said heat generating elements to define a recording section through which an ink donor sheet and a recording sheet pass in superimposed relation and separating roll means spaced from said backing roll so that the contact pressure between the ink donor sheet and recording sheet is substantially lower at the separating roll means than at said recording section.

The foregoing and other objects, features and advantages of the invention will be apparent from the following more particular description of a preferred embodiment of the invention as illustrated in the accompanying drawings.

DETAILED DESCRIPTION OF THE INVENTION

Figure 1:
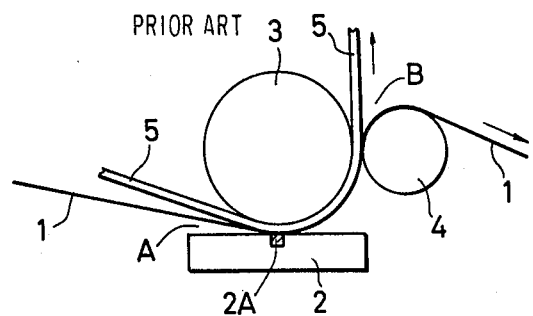
FIG. 1 is a schematic side view of a conventional prior art heat-sensitive transfer type recording device.
Figure 2:
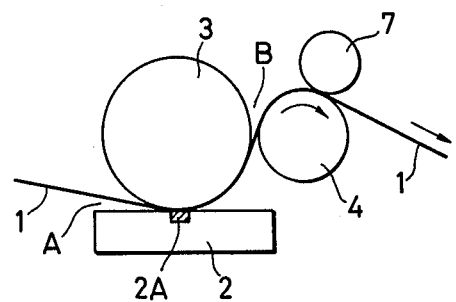
FIG. 2 is a schematic side view of a heat-sensitive transfer type recording device according to the present invention to which a recording sheet has not yet been supplied.
Figure 3:
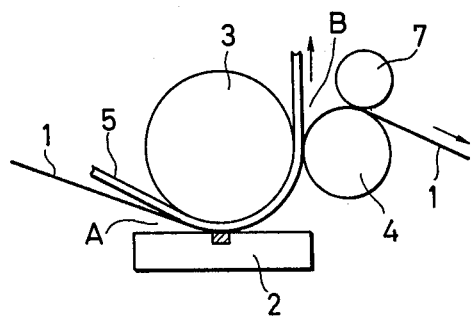
FIG. 3 is a schematic side view of the device in FIG. 2 with a recording sheet passing through the device.

A first embodiment of the heat-sensitive transfer type recording device according to the present invention is shown in FIGS. 2 and 3. Those components which have been previously described with respect to the prior art device shown in FIG. 1 are provided with the same numbers. In the device, a gap, which is substantially equal to the thickness of one recording sheet is provided between the backing roll 3 and the drive roll 4 which is driven by suitable drive means (not shown). A pinch roll 7 is provided obliquely above the drive roll 4 away from the backing roll 3. The ink donor sheet 1 is supplied from a supply roll (not shown) and after passing through the recording section A and the separating section B is passed between the drive roll 4 and the pinch roll 7 and wound up on a suitable winding roll (not shown). The pinch roll 7 is pressed against the ink donor sheet 1 and the drive roll 4 under a pressure of 7 Kg/cm$^2$.

When the recording operation is started in the device, the drive roll 4 is turned in the direction of the arrow on the drive roll and the ink donor sheet 1 is conveyed in the direction of the arrow to the right of the drive roll. Under these conditions, the recording sheet is supplied to the recording section A from a suitable supply source (not shown). When the recording sheet passes over the heat generating elements 2A in the recording section, data is thermally transferred onto the recording sheet in the manner previously described. The recording sheet 5 onto which the data has been transferred passes to the separating section B while remaining in contact with the cylindrical wall of the backing roll 3.

The ink donor sheet 1 and the recording sheet 5 are shown in FIG. 3 as passing through the separating section B. The ink donor sheet 1 and the recording sheet 5 pass between the backing roll 3 and the drive roll 4 while being pressed at a pressure of 0–2 Kg/cm². The direction of advancement of the ink donor sheet 1 is abruptly changed along the cylindrical wall of the drive roll 4 so the recording sheet 5 is peeled off the ink donor sheet 1.

Figure 4:
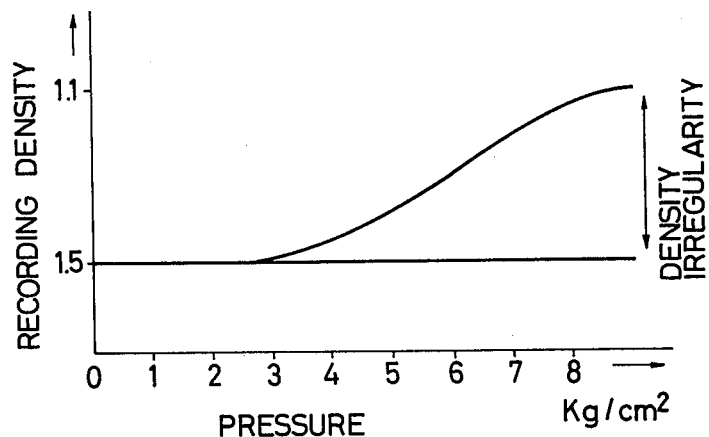
FIG. 4 is a graph showing the relationship of applied pressures between an ink donor sheet and a recording sheet and the resulting ink density on the recording sheet.

The graph in FIG. 4 shows the relationship between the pressure applied to the ink donor sheet and the recording sheet immediately prior to the peeling off of the recording sheet and the ink density on the recording sheet. In the case of a heat-sensitive transfer type recording device according to the present invention, when a pressure of 3 Kg/cm² or less is applied, a recording density of 1.5 is provided for all the black signals. However, when the applied pressure is higher than 3 Kg/cm² irregularities are caused in the density of the ink transferred to the recording sheet. This tendancy becomes significant as the pressure is increased. By maintaining the applied pressure to the ink donor sheet 1 and the recording sheet 5 immediately prior to separation at a value of 3 Kg/cm² or less, there will be no irregularities in the density of the ink on the recording sheet. Since the drive roll 4 is arranged adjacent to the backing roll 3, the drive roll 4 can serve as a guide roll or a guide member which directs the separated recording sheet 5 to a receiving tray.

Figure 5:
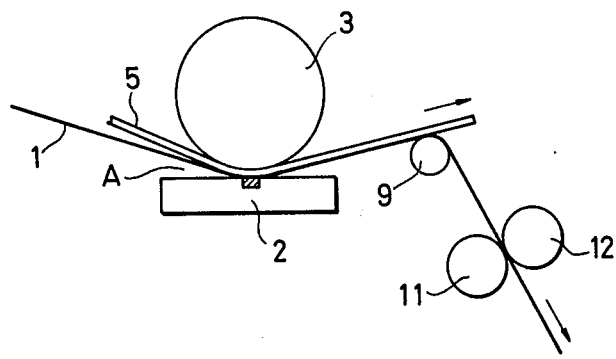
FIG. 5 is a schematic side view of a modified recording device according to the present invention.

In the embodiment of the invention shown in FIG. 5, a separating roll 9 is arranged near the discharge outlet for the device which is at a predetermined distance from the recording section A and a pair of conveying rolls 11 and 12 are provided below the separating roll 9 to convey the ink donor sheet 1 in the direction of the arrow. Immediately after passing through the recording section A, the recording sheet is separated from the cylindrical wall of the backing roll 3 and is delivered to the discharge outlet (not shown). In this embodiment, no pressure at all is applied between the ink donor sheet and the recording sheet at the separating roll 9. In view of the lack of pressure, there will not be any irregularities in the density of the ink transferred to the recording sheet which has been separated from the ink donor sheet. By having the two conveying rolls 11 and 12, the ink donor sheet can be conveyed with a sufficiently strong force. Therefore, instability in the running of the ink donor sheet, such as slipping of the latter, can be eliminated thereby contributing to an improvement in the linearity of the recorded image. In the embodiment wherein the small gap is provided between the backing roll and the drive roll, the two rolls may be so arranged that they are in contact with both surfaces of the ink donor sheet at all times to assist in the feeding of the ink donor sheet.

While the invention has been particularly shown and described with reference to preferred embodiments thereof, it will be understood by those in the art that various changes in form and details may be made therein without departing from the spirit and scope of the invention.

What is claimed is:

1. A heat sensitive transfer type recording device comprising a thermal head having heat generating elements, a backing roll operatively positioned relative to said heat generating elements to provide for the passage of an ink donor sheet and a recording sheet therebetween under pressure, a separation roll disposed downstream of said thermal head relative to the direction of movement of said sheet and spaced from said backing roll, said thermal element and said separation roll being so mounted relative to said backing roll that the pressure exerted on said sheets between said separation roll and said backing roll will be less than the pressure exerted on said sheets between said thermal element and said backing roll.

2. A heat-sensitive transfer type recording device as set forth in claim 1, wherein said separation roll is a driving roll and is spaced from said backing roll at a distance to provide a contact pressure between said ink donor sheet and said recording sheet as they pass therebetween no greater than 3 Kg/cm².

3. A heat-sensitive transfer type recording device as set forth in claim 1, wherein said separation roll is spaced from said backing roll at a distance such that the contact pressure between said ink donor sheet and said recording sheet as said sheets pass over said separation roll is substantially 0 Kg/cm².

4. A heat-sensitive transfer type recording device as set forth in claim 3, further comprising a pair of conveying rolls downstream of said separation roll in the direction of movement of said ink donor sheet for conveying said ink donor sheet through said device.

* * * * *